(12) United States Patent
Park

(10) Patent No.: US 11,122,124 B2
(45) Date of Patent: Sep. 14, 2021

(54) METHOD AND APPARATUS FOR CONTROLLING WIRELESS COMMUNICATION FOR INSTALLING WIRELESS INTERNET IN IOT DEVICES

(71) Applicant: Dialog Semiconductor Korea Inc., Seongnam-si (KR)

(72) Inventor: Chang Hwan Park, Seongnam-si (KR)

(73) Assignee: Dialog Semiconductor Korea Inc., Seongnam-si (KR)

( * ) Notice: Subject to any disclaimer, the term of this patent is extended or adjusted under 35 U.S.C. 154(b) by 0 days.

(21) Appl. No.: 16/680,525

(22) Filed: Nov. 12, 2019

(65) Prior Publication Data

US 2020/0186604 A1 Jun. 11, 2020

(30) Foreign Application Priority Data

Dec. 6, 2018 (KR) .......................... 10-2018-0156262

(51) Int. Cl.
| | |
|---|---|
| *H04L 12/18* | (2006.01) |
| *H04W 76/10* | (2018.01) |
| *H04W 84/12* | (2009.01) |
| *H04L 29/08* | (2006.01) |
| *H04W 4/70* | (2018.01) |

(Continued)

(52) U.S. Cl.
CPC ............ *H04L 67/12* (2013.01); *H04L 12/189* (2013.01); *H04L 67/10* (2013.01); *H04W 4/70* (2018.02); *H04W 4/80* (2018.02); *H04W 76/10* (2018.02); *H04W 84/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2014/0036892 A1* | 2/2014 | Zhu .................. | H04W 88/16 370/338 |
| 2014/0071870 A1 | 3/2014 | Abraham et al. | |

(Continued)

FOREIGN PATENT DOCUMENTS

| | | |
|---|---|---|
| CN | 103529793 A | 1/2014 |
| CN | 103648134 A | 3/2014 |

(Continued)

OTHER PUBLICATIONS

Korean Office Action, Application No. 10-2018-156262, Applicant: Dialog Semiconductor Korea Inc., dated Nov. 16, 2019.

(Continued)

*Primary Examiner* — Joshua Joo
(74) *Attorney, Agent, or Firm* — Saile Ackerman LLC; Stephen B. Ackerman

(57) ABSTRACT

A wireless communication controlling apparatus for installing wireless Internet of an Internet of Things device is provided. There is provided a wireless communication controlling apparatus which supports the setup of an IoT device in connection with a user terminal based on an application, and if it fails, supports the setup of wireless Internet of the IoT device in connection with the user terminal based on an AP mode. A wireless communication controlling apparatus that does not support the above process supports easy setup based on a concurrent mode of a provision AP.

7 Claims, 7 Drawing Sheets

(51) Int. Cl.
*H04W 84/18* (2009.01)
*H04W 4/80* (2018.01)

(56) References Cited

U.S. PATENT DOCUMENTS

| | | | | |
|---|---|---|---|---|
| 2015/0043414 | A1* | 2/2015 | Han | H04L 1/1628 370/312 |
| 2016/0087811 | A1* | 3/2016 | Yin | H04W 48/16 370/312 |
| 2017/0181090 | A1* | 6/2017 | Park | H04L 27/26 |
| 2018/0227969 | A1* | 8/2018 | Verkaik | H04L 12/189 |
| 2019/0373675 | A1* | 12/2019 | Chari | H04W 74/006 |

FOREIGN PATENT DOCUMENTS

| | | |
|---|---|---|
| CN | 104519513 A | 4/2015 |
| CN | 104604304 A | 5/2015 |
| KR | 10-0532101 | 11/2005 |
| KR | 10-2018-0129613 | 12/2018 |

OTHER PUBLICATIONS

Chinese Office Action, Application No. 201911219556.9, Applicant: Dialog Semiconductor Korea Inc., dated Jun. 29, 2021, 11 pages.

\* cited by examiner

METHOD AND APPARATUS FOR CONTROLLING WIRELESS COMMUNICATION FOR INSTALLING WIRELESS INTERNET IN IOT DEVICES

RELATED APPLICATION

This application claims the benefit of priority under of Korean Patent Application No. 10-2018-0156262 filed on Dec. 6, 2018, the contents of which are incorporated by reference as if fully set forth herein in their entirety.

FIELD AND BACKGROUND OF THE INVENTION

The disclosure relates to an apparatus for controlling wireless communication for installing wireless internet in IoT devices.

The background art described hereinafter only provides the background information related to an embodiment of the disclosure, but is not related to the prior art.

With the development of information communication technology, ubiquitous society is coming to reality. The ubiquitous society has developed more rapidly with the development of Internet of Things (IoT) technology. Therefore, a user may use various services through IoT devices connected to the Internet.

In order to use IoT service, the user needs to install an IoT device in the room. For example, the user scans Service Set IDentifier (SSID), and selects the SSID to be connected from the scan list. However, the user may not know which AP to choose among a plurality of access points (APs). There is a problem in that if the user selects the incorrect SSID or inputs the incorrect security information, the process of restoration to the setup process could be very complicated.

SUMMARY OF THE INVENTION

An aspect of the exemplary embodiments relates to providing a wireless communication controlling apparatus which supports the setup of an IoT device in connection with a user terminal based on an application, and if it fails, supports the setup of wireless Internet of the IoT device in connection with the user terminal based on an AP mode.

According to one aspect of an embodiment, there is provided a wireless communication controlling apparatus including an interface part configured to provide an interface for supporting an application, a data receiver configured to receive a multicast packet from a user terminal based on the application, a wireless communicator configured to support wireless communication in a concurrent mode for receiving the multicast packet, a legacy AP connector configured to attempt to access a legacy AP using the multicast packet based on the concurrent mode, and a controller configured to determine whether the legacy AP is accessed within a predetermined threshold period of time.

According to another aspect of an embodiment, there is provided a wireless communication controlling method including operating an application, data receiving for receiving a multicast packet from a user terminal based on the application, supporting wireless communication in a concurrent mode for receiving the multicast packet, legacy AP accessing for attempting to access a legacy AP using the multicast packet based on the concurrent mode, and determining whether the legacy AP is accessed within a predetermined threshold period of time.

As described above according to an embodiment, there is provided a wireless communication controlling apparatus which supports the setup of an IoT device in connection with a user terminal based on an application, and if it fails, supports the setup of wireless Internet of the IoT device in connection with the user terminal based on an AP mode.

In addition, a user who is not familiar with an IoT device in the room may easily set up the IoT device. To be specific, it is possible to immediately confirm whether the input information (SSID or password) is correct, and if not, a process of restoration to a setup process can be simply performed.

Further, according to an embodiment, there is no need for an additional hardware interface (HW Physical Interface) other than a WiFi interface.

DESCRIPTION OF SPECIFIC EMBODIMENTS OF THE INVENTION

Hereinafter, an embodiment will be described in detail with reference to the accompanying drawings. In describing the elements of the disclosure, the terms such as "first" and "second" can be used. The terms are used simply to distinguish one element from other elements, but the nature, order, sequence, etc. of the elements are not limited by such terms. In this specification, terms such as 'comprise', 'include' and 'have/has' should be construed as designating that there are such elements, characteristics, step or a combination thereof in the specification, not to exclude the existence or possibility of adding one or more of elements, other characteristics, step or a combination thereof.

The term 'station' or 'STA' in an embodiment of the disclosure includes a wireless transmitting and receiving unit (WTRU), a mobile terminal, a user equipment (UE), a mobile station, a stator or pager, a cellular phone, a PDA, a computer, or any other types of devices that can operate in a wireless environment.

For the purpose of explaining the disclosure, the term 'mode' includes Bluetooth (BT), Wi-Fi Direct (WFD), and STA+AP mode in addition to Peer to Peer (P2P), and Soft AP.

The term 'concurrent' according to an embodiment means that two interfaces of STA and AP are concurrently operated.

Figure 1:
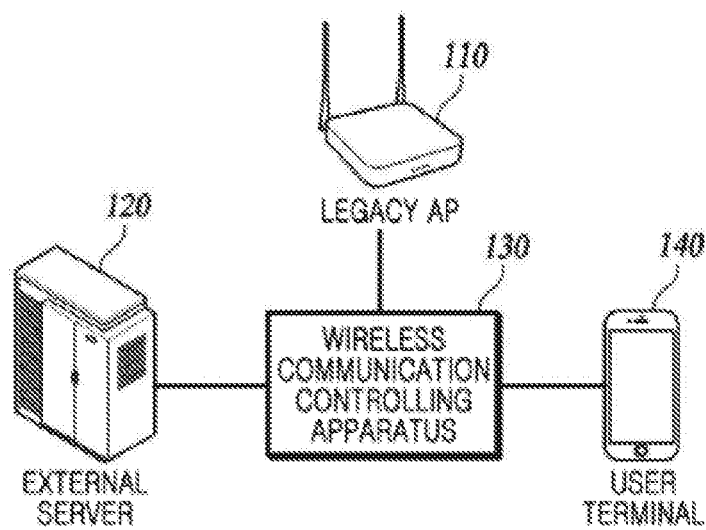
FIG. 1 is a schematic exemplary view illustrating a setup control system of an Internet of Things device.

FIG. 1 is a schematic exemplary view illustrating a setup control system of an Internet of Things device.

Referring to FIG. 1, a setup control system of an Internet of things device may include a legacy AP 110, an external server 120, a wireless communication controlling apparatus 130, and a user terminal 140.

The Legacy Access Point (legacy AP) 110 may perform wireless communication with the user terminal 140 based on a network. The legacy AP 110 may receive at least one multicast packet from the user terminal 140 and transmit the received multicast packet to the wireless communication controlling apparatus 130 based on wireless communication.

The multicast packet means data packet including Service Set IDentifier (SSID) and password of the legacy AP 110. The legacy AP 110 may include the SSID and the password in a multicast address, and transmit the multicast address to the wireless communication controlling apparatus 130. The multicast address may be included in Mac Header.

MAC may be used to refer to a MAC layer for performing functions of segmentation and connection of data to be transmitted and received based on physical layers and transmission channels to which data is transmitted and received. In other words, wired or wireless communication devices may share a transmission medium, but in order to share the transmission capability of the medium, a method for controlling access to the transmission medium may be required, and such method is defined by Media Access Control (MAC).

The legacy AP 110 may receive an access request from the wireless communication controlling apparatus 130, and perform wireless communication with the wireless communication controlling apparatus 130. The legacy AP 110 may be a kind of router using wireless communication, and may operate an STA/AP mode as a setup mode.

The external server 120 may perform wireless communication with the legacy AP 110 based on a network. The external server 120 may be an external cloud server that stores data related to the setup of the IoT device, and the cloud server may be a website personal storage space such as a web hard drive or a media server. The external server 120 may perform communication with the wireless communication controlling apparatus 130 via the legacy AP 110 based on IP/Port information received when the wireless communication controlling apparatus 130 installs the wireless Internet of the IoT device.

The external server 120 may be connected to the wireless communication controlling apparatus 130 based on the network. To be specific, the user terminal 140 may receive information related to the external server 120, i.e. IP/Port information from the legacy AP 110 and transmit the information to the wireless communication controlling apparatus 130. The external server 120 may receive a connection request from the wireless communication controlling apparatus 130 and be connected to the wireless communication controlling apparatus 130.

The network may be a network capable of transmitting and receiving data via an Internet protocol using various wired and wireless communication technologies such as an Internet network, an intranet network, a mobile communication network, and a satellite communication network. Such network may collectively refer to a closed type network such as a Local Area Network (LAN), a Wide Area Network (WAN), and an open network such as the Internet, as well as networks such as a Code Division Multiple Access (CDMA), a Wideband Code Division Multiple Access (WCDMA), Global System for Mobile Communications (GSM), Long Term Evolution (LTE), Evolved Packet Core (EPC), 5 G, etc. and next generation networks and cloud computing networks to be implemented in the future.

The wireless communication controlling apparatus 130 may be connected to the user terminal 140 based on wireless communication. To be specific, the wireless communication controlling apparatus 130 may be operable in association with the user terminal 140 through an application related to the setup of the wireless Internet. The wireless communication controlling apparatus 130 may receive the legacy AP information, i.e. the SSID and the password of the legacy AP 110 from the user terminal 140 based on the application. The wireless communication controlling apparatus 130 may access the legacy AP 110 using the received legacy AP information.

The wireless communication controlling apparatus 130 may transmit an access success message (hereinafter, a first message) that indicates the access to the legacy AP 110 has succeeded to the user terminal 140 through application interlocking. The wireless communication controlling apparatus 130 may receive IP/Port information of the external server 120 from the user terminal 140. The wireless communication controlling apparatus 130 may access the external server 120 using the received IP/Port information. After the wireless communication controlling apparatus 130 connects to the external server 120, the wireless communication controlling apparatus 130 may transmit a connection success message (hereinafter, a second message) that indicates the connection to the external server 120 has succeeded to the user terminal 140. The operation of the wireless communication controlling apparatus 130 will be described in detail with reference to FIG. 6 and FIG. 7.

The wireless communication controlling apparatus 130 may be provided in an IoT device, or in a separate external device.

The user terminal 140 may be connected to the legacy AP 110 based on the network. The user terminal 140 may transmit the legacy AP information to the wireless communication controlling apparatus 130 based on the application related to the setup of the wireless Internet.

The user terminal 140 may receive the first message from the wireless communication controlling apparatus 130. The user terminal 140 may transmit the IP/Port information of the external server 120 to the wireless communication controlling apparatus 130 through the application. The user terminal 140 may receive the second message from the wireless communication controlling apparatus 130. The user terminal 140 may receive the second message, and notify the user through the application that the wireless Internet connection of the IoT device has been completed. The operation of the user terminal 140 will be described in detail with reference to FIG. 5.

The user terminal 140 may be electronic apparatuses such as a smart phone, a tablet, a laptop, a Personal Computer (PC), a Portable Multimedia Player (PDA), a wireless communication terminal, etc. The user terminal 140 may include a memory 270 for storing web browsers and programs for accessing the wireless communication controlling apparatus 130, and a microprocessor for calculating and controlling by executing the programs.

Figure 2:
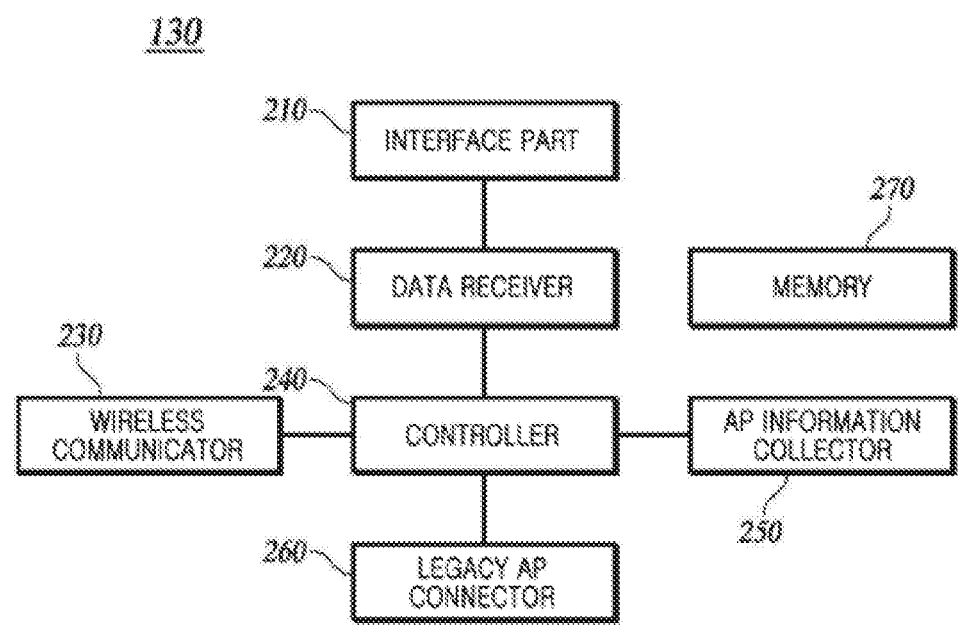
FIG. 2 is a schematic block diagram to explain a wireless communication controlling apparatus according to an embodiment.

FIG. 2 is a schematic block diagram to explain a wireless communication controlling apparatus according to an embodiment.

Referring to FIG. 2, a wireless communication controlling apparatus 130 according to an embodiment may include an interface part 210, a data receiver 220, a wireless communicator 230, a controller 240, an AP information collector 250, a legacy AP connector 260, and a memory 270. However, the elements included in the wireless communication controlling apparatus 130 are not limited thereto.

The interface part 210 may support an application for supporting the setup of the wireless Internet of the IoT device. The interface part 210 may receive an input signal for operating an application, for example, a touch signal of a keypad or a touch screen, a voice signal through a microphone, etc. to support the pre-installed application.

The data receiver 220 may be a communication module for receiving a multicast packet from the user terminal 140. The data receiver 220 may receive the multicast packet from the user terminal 140 based on the application that is pre-installed in the IoT device. The multicast packet may be data packet including the AP information, i.e. SSID and password. The data receiver 220 may transmit the legacy AP information to the legacy AP connector 260 according to a result of a determination of the controller 240.

The wireless communicator 230 may be a kind of communication module for supporting all services related to wireless communication. The wireless communicator 230 may perform wireless communication with the external server 120, the legacy AP 110, or the user terminal 140 using Wi-Fi, Zigbee, Bluetooth, CDMA, IMT-2000, HSDPA, WiMax, WiBro, 3GPP, LTE, etc. In an embodiment, Wi-Fi will be exemplified for convenience of explanation, but is not limited thereto.

The wireless communicator 230 may support wireless communication in a concurrent mode, i.e. an AP mode and a station mode (STA mode) for receiving multicast packet. To be specific, the STA mode may support such that the IoT device provides the IoT service to the user. The AP mode may support the connection between the wireless communication controlling apparatus 130 and the user terminal 140 when access to the legacy AP 110 fails. The AP mode may support receiving the legacy AP information from the provisioning AP (AP) that functions as provisioning. The STA mode and the AP mode may be concurrently operated, or selectively operated according to user's selection. The provisioning AP will be described with reference to FIG. 4.

The wireless communicator 230 may receive an access request from the user terminal 140 based on the AP mode. To be specific, the wireless communicator 230 may operate the AP mode when the legacy AP connector 260 fails to access the legacy AP 110, and receive a connection request from the user terminal 140. The wireless communicator 230 may transmit the first message or the second message to the user terminal 140.

The wireless communicator 230 may complete the setup of the wireless Internet of the IoT device in connection with the user terminal based on the AP mode, change the AP mode to the STA mode, and support the IoT service of the user.

The controller 240 may determine whether the data receiver 220 receives a multicast packet. The controller 240 may control the setup path of the IoT device based on whether the multicast packet is received at the data receiver 220.

When it is determined that the multicast packet is received, the controller 240 may control the legacy AP connector 260 to attempt to access the legacy AP 110 based on the multicast packet (the first path). The controller 240, when it is determined that the multicast packet is not received, may control the AP information collector 250 to connect the user terminal 140 and to collect the legacy AP information included in the multicast packet (the second path). The controller 240 may provide the user with the effect of simplifying the setup of the wireless Internet of the IoT device using the first path and the second path.

The controller 240 may control the setup path of the IoT device based on a threshold time at which the legacy AP connector 260 accesses the legacy AP 110 other than whether one or more of multicast packets are received. For example, when the user sets the threshold time for the multicast packet to 10 seconds, the controller 240 may determine whether the multicast packet is received within the threshold time of 10 seconds. The controller 240 may control the setup path of the IoT device with the first path when the multicast packet is received within 10 seconds, and with the second path when the multicast packet is received after 10 seconds.

When the legacy AP connector 260 fails to access the legacy AP 110, the controller 240 may control the data receiver 220 to receive the multicast packet again (hereinafter, feedback control). The controller 240 may set the wireless communicator 230 to use both the STA mode and the AP mode for feedback control, and simplify the process of the restoration through the feedback control.

The AP information collector 250 may collect the legacy AP information of the multicast packet according to the result of the determination of the controller 240. For example, the AP information collector 250 may collect the legacy AP information from the user terminal 140 when it is determined that the multicast packet is not received, or access to the legacy AP 110 fails within a predetermined time. The AP information collector 250 may collect the legacy AP information using the AP mode of the wireless communicator 230. The AP information collector 250 may collect the legacy AP information from the user terminal 140 based on the AP mode when the legacy AP connector 260 fails to access the legacy AP 110 based on the STA mode.

The legacy AP connector 260 may attempt to access the legacy AP 110 based on the legacy AP information received or separately stored in the memory 270. When accessing the legacy AP 110, the legacy AP connector 260 may notify the wireless communicator 230 that it successfully accesses the legacy AP 110.

The memory 270 may store a multicast packet or temporary information that is necessary for supporting the wireless communication. The memory 270 may be embodied as Electrically Erasable Programmable Read-Only Memory (EEPROM), but is not limited thereto. The memory can memorize for a long time without supply of electricity, and a memory device of removing and wiring the recorded data could be replaced by any type of device.

The provisioning communicator (not shown) may support the wireless communication controlling apparatus 130 to operate as the provisioning AP using the concurrent mode of the wireless communicator 230. For example, the provisioning communicator may receive the legacy AP information using the AP mode of the concurrent mode, and perform an operation for confirming the validity of the legacy AP information using the STA mode. Therefore, the provisioning communicator may support the wireless communication controlling apparatus 130 to operate with the provisioning AP based on the concurrent mode.

Figure 3:
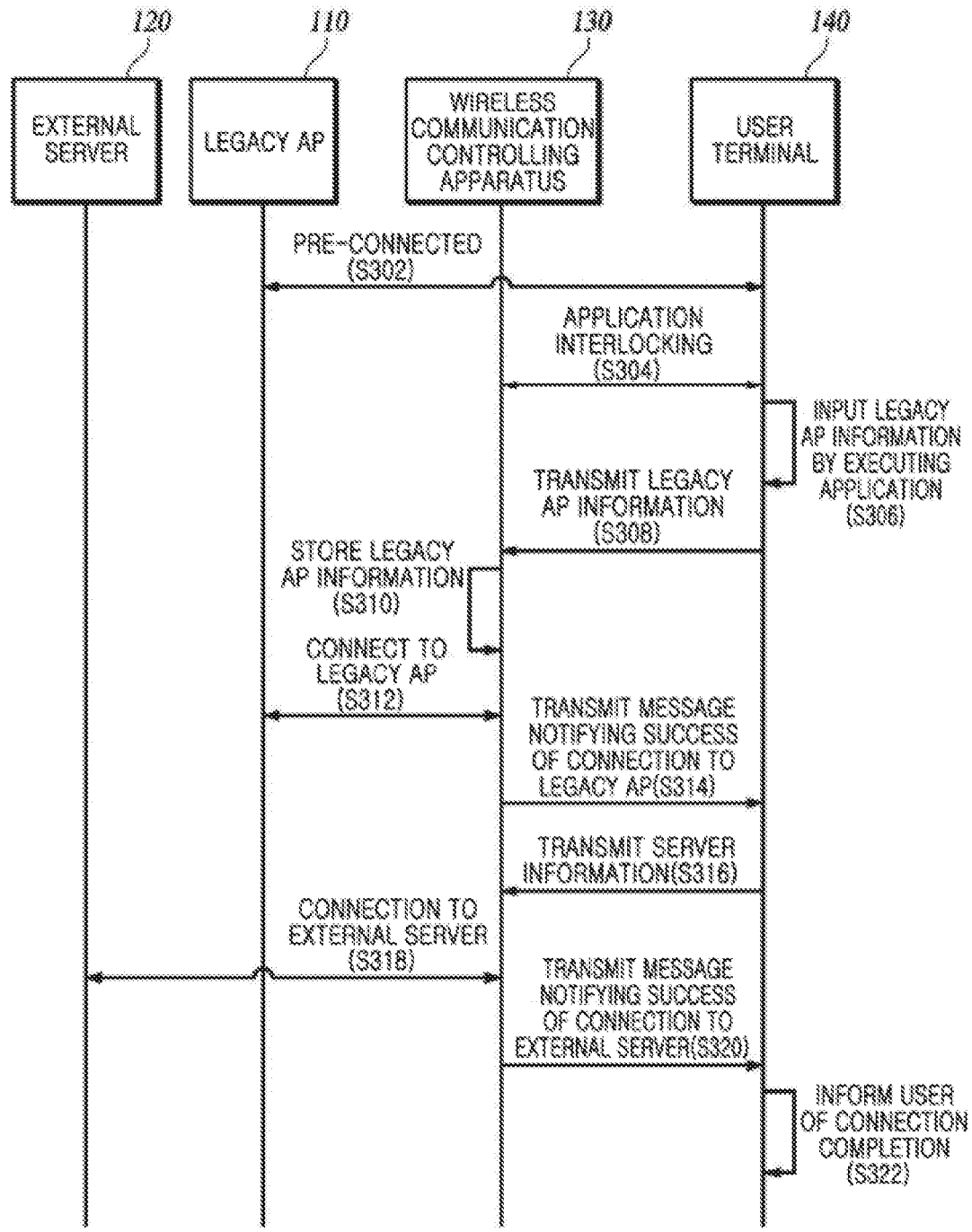
FIG. 3 is a schematic flowchart to explain an operation of a setup control application related to a setup control of an Internet of Things device.

FIG. 3 is a schematic flowchart to explain an operation of a setup control application related to a setup control of an Internet of Things device.

The user terminal 140 may be in pre-connection with the legacy AP 110 based on the network to perform wireless communication at step S302.

The wireless communication controlling apparatus 130 may be operable in association with the user terminal 140 through the application related to the setup control of the IoT device at step S304.

The user terminal 140 may input the legacy AP information according to user's operation or command at step S306. The legacy AP information may also be retrieved from stored information when the user terminal 140 is connected to the legacy AP 110.

The user terminal 140 may transmit the legacy AP information to the wireless communication controlling apparatus 130 at step S308. The wireless communication controlling apparatus 130 may store the received legacy AP information at step S310, and attempt connection to the legacy AP 110 based thereon at step S312.

When access to the legacy AP 110 has succeeded, the wireless communication controlling apparatus 130 may transmit the access success message (the first message) to the user terminal 140 at step S314.

The user terminal 140 may transmit the IP/Port information of the external server 120 in response to the received first message at step S316.

The wireless communication controlling apparatus 130 may attempt connection to the external server 120 based on the received IP/Port information of the external server 120 at step S318. When connection to the external server 120 has succeeded, the wireless communication controlling apparatus 130 may transmit the connection success message (the second message) to the user terminal 140 at step S320.

The user terminal 140 may notify the completion of the connection to the external server 120 to the user through the display thereof at step S322. The first message and the second message may be transmitted as text data, voice data, etc. or various forms of data that can be notified to the user may be possible.

Figure 4:
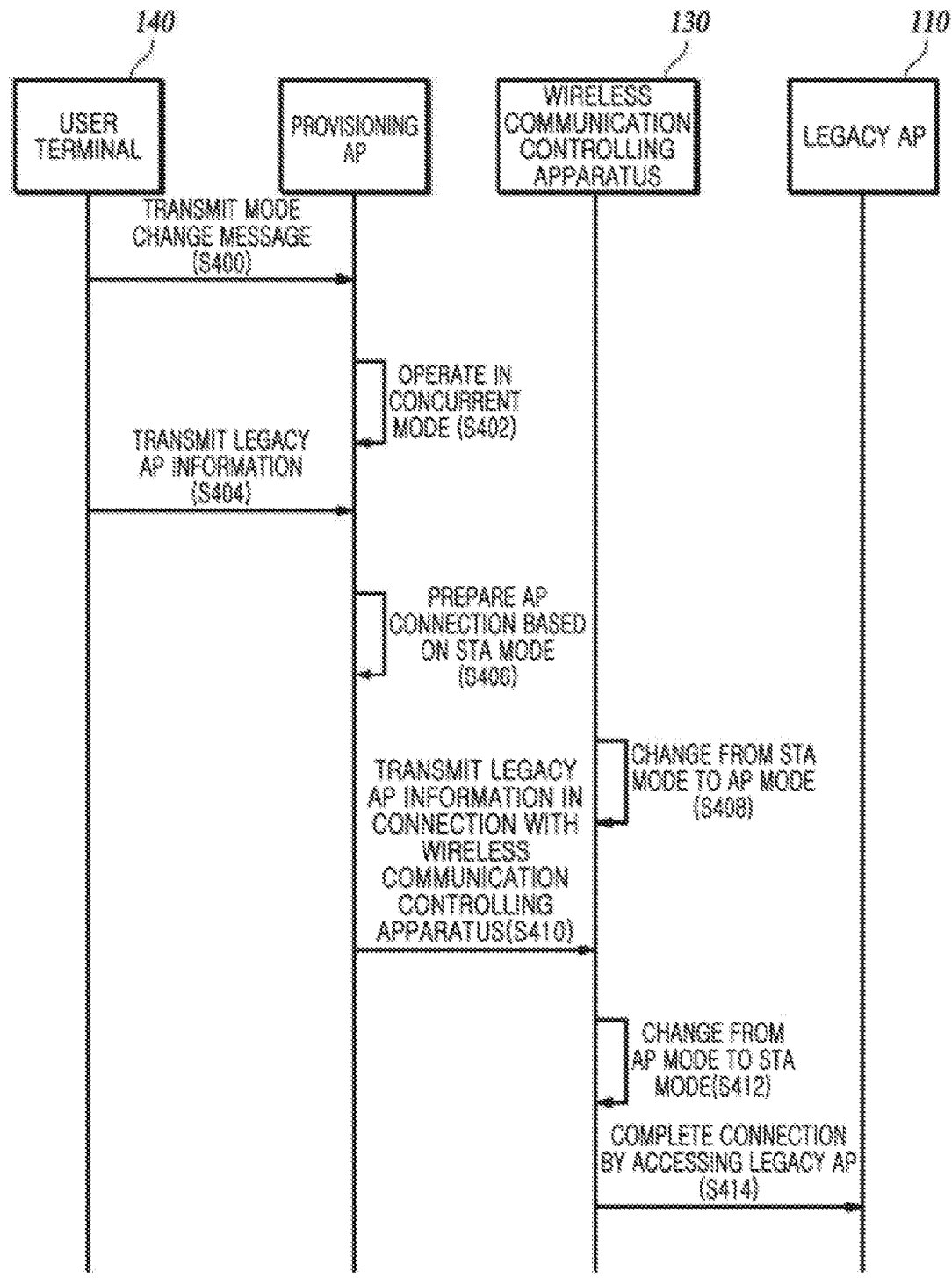
FIG. 4 is a schematic flowchart to explain a setup control process of an Internet of Things device when there is a provisioning AP.

FIG. 4 is a schematic flowchart to explain a setup control process of an Internet of Things device when there is a provisioning AP.

Referring to FIG. 4, the user terminal 140 may transmit a mode change message to the provisioning AP at step S400. The mode change message may be signal information that allows the provisioning AP to change a mode, and it may be embodied in various forms such as Text, MQTT json, xml, etc.

The provisioning AP may receive the mode change message from the user terminal 140, and operate in a concurrent mode accordingly at step S402. The provisioning AP may perform as a relay to connect the user terminal 140 and the wireless communication controlling apparatus 130. At least one provisioning AP may be present in the room, and when the legacy AP functions as the provisioning AP, the provisioning AP and the legacy AP 110 may be embodied as the same AP.

The user terminal 140 may transmit the legacy AP information to the provisioning AP at step S404. The legacy AP information may include the IP/Port information of the external server 120 other than the service set identifier and the password of the legacy AP 110.

The provisioning AP may prepare to access another AP other than itself based on the STA mode at step S406.

The wireless communication controlling apparatus 130 may change a setup from the STA mode to the AP mode at step S408. The wireless communication controlling apparatus 130 is automatically changed to the AP mode by receiving a separate operation message from the provisioning AP, or manually changed to the AP mode. For example, the wireless communication controlling apparatus 130 may be set to be changed to the AP mode when a user presses a specific button of the IoT device for five seconds.

The provisioning AP may access in the AP mode of the wireless communication controlling apparatus 130 and transmit the legacy AP information at step S410.

The wireless communication controlling apparatus 130 may receive the legacy AP information, and change the AP mode to the STA mode at step S412. The wireless communication controlling apparatus 130 may access the legacy AP based on the STA mode and complete the setup of the wireless Internet at step S414.

Figure 5:
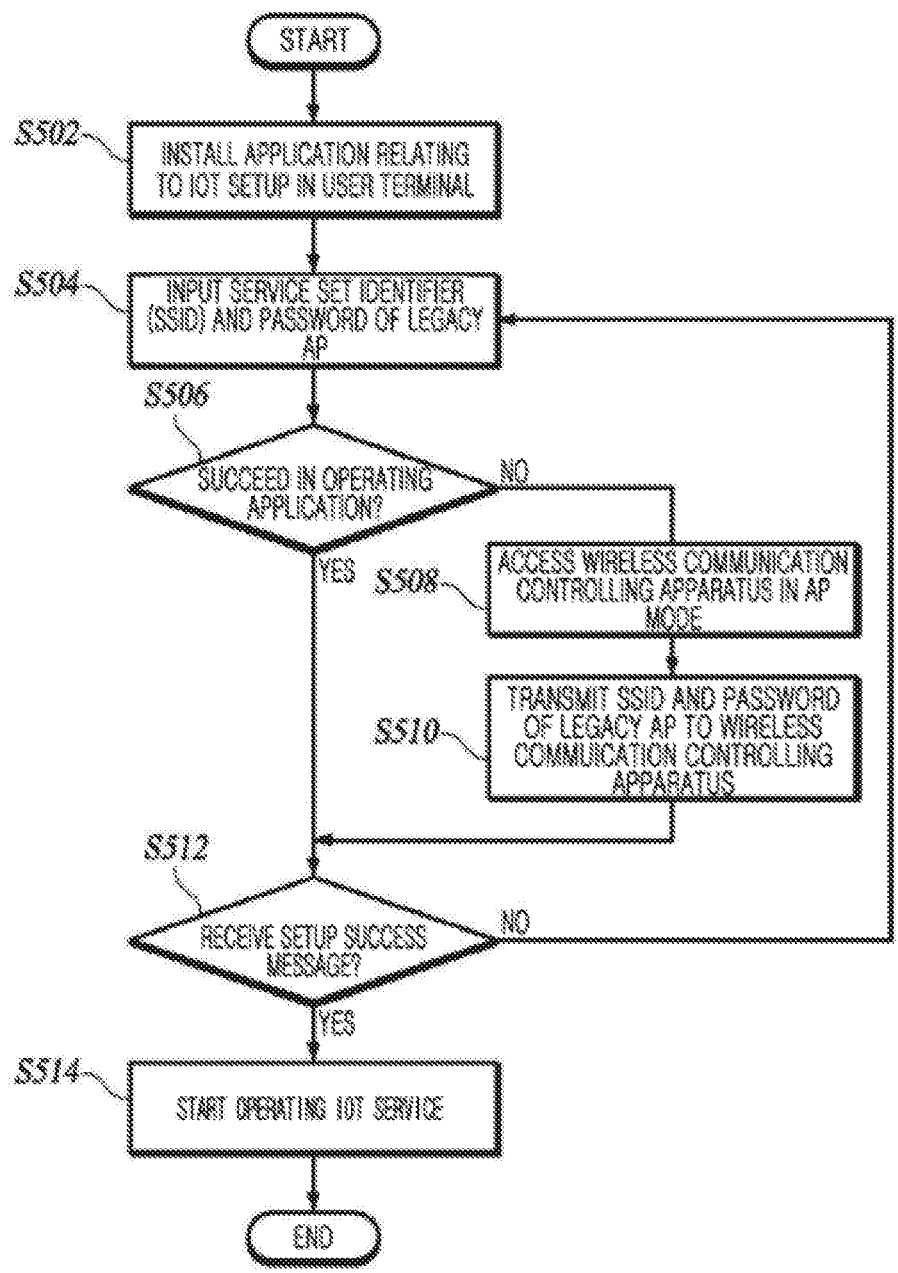
FIG. 5 is a flowchart to explain a process of operating a user terminal on a setup control system of the IoT device.

FIG. 5 is a flowchart to explain a process of operating a user terminal on a setup control system of the IoT device.

The user may install a setup control application related to IoT device setup in the user terminal 140 at step S502. The setup control application may be installed in the wireless communication controlling apparatus 130 to support interlocking of devices.

The user may input the legacy AP information, i.e. the service set identifier (SSID) and the password of the legacy AP 110 to the user terminal 140 at step S504.

The user terminal 140 may operate differently depending upon whether the application normally operates to be operable in association with the wireless communication controlling apparatus 130 at step S506.

When the application operates successfully, the user terminal 140 may wait to receive a separate access success message and connection success message from the wireless communication controlling apparatus 130 at step 512. When the application fails to operate, the user terminal 140 may access the wireless communication controlling apparatus 130 in the AP mode at step S508.

The user terminal 140 may transmit the legacy AP information to the wireless communication controlling apparatus 130 at step S510. When the wireless communication controlling apparatus 130 stores the legacy AP information, but fails to operate the application at step S506, the wireless communication controlling apparatus 130 may omit step S510, but may use the additionally stored legacy AP information.

When receiving a setup success message including the first message and the second message from the wireless communication controlling apparatus 130, the user terminal 140 may remotely support the IoT service at step S514. The user terminal 140 may receive the setup success message and output a message indicating that the setup of the IoT device has been completed to the user.

FIG. 5 describes that steps S502 to S514 are sequentially executed, but the disclosure is not limited thereto. In other words, the steps in FIG. 5 could be changed to be executed, or one or more of the steps could be executed in parallel. Therefore, the steps in FIG. 5 are not limited to execute in order of time series.

Figure 6:
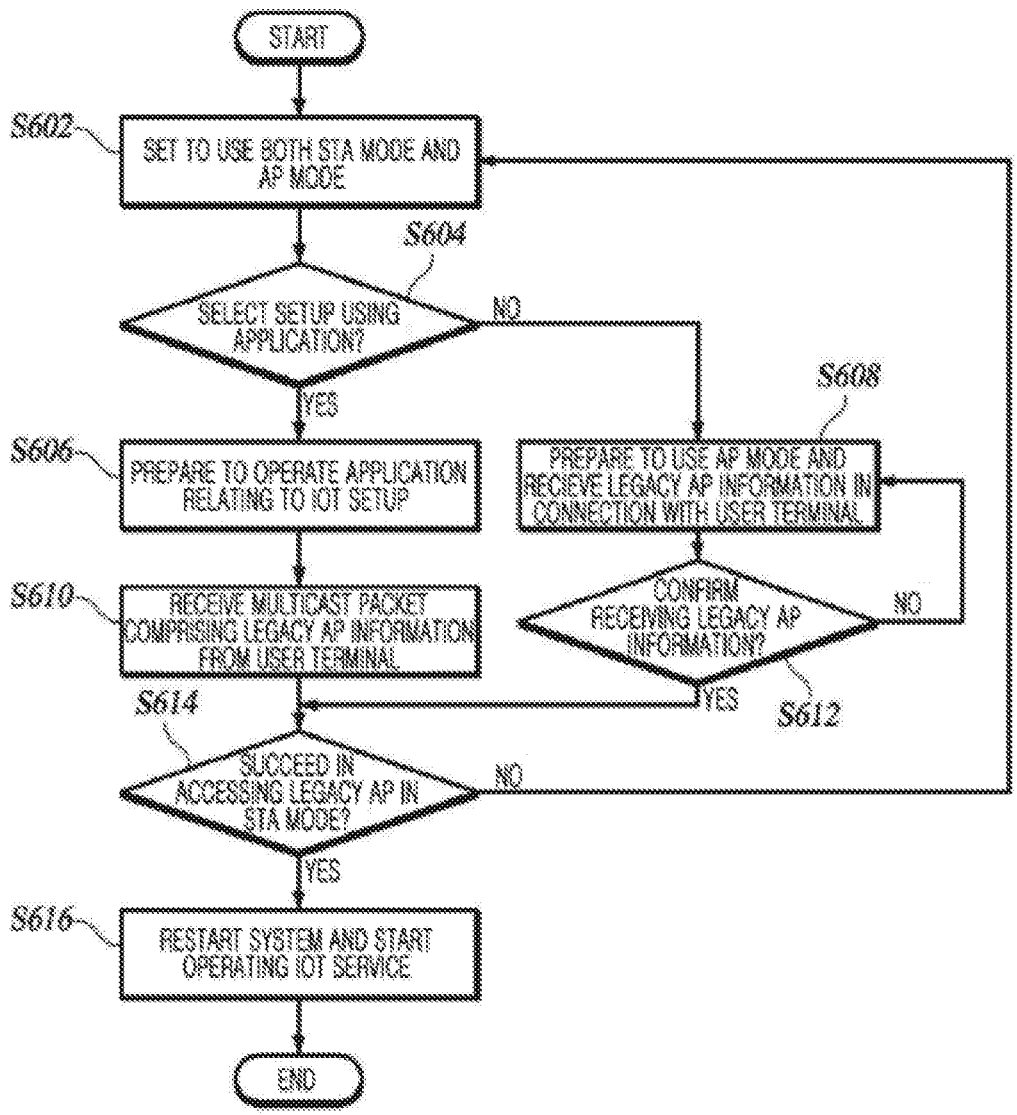
FIG. 6 is a flowchart to explain a method that a wireless communication controlling apparatus supports the setup of wireless Internet of the IoT device.

FIG. 6 is a flowchart to explain a method that a wireless communication controlling apparatus supports the setup of wireless Internet of the IoT device.

Referring to FIG. 6, the wireless communication controlling apparatus 130 according to an embodiment may be set to use both the STA mode and the AP mode at step S602. The wireless communication controlling apparatus 130 may perform wireless Internet setup of the IoT device in connection with the user terminal 140 based on the application, or perform the wireless Internet setup based on the AP mode, according to user's selection at step S604.

The wireless communication controlling apparatus 130 may prepare to operate an application if selecting the wireless Internet setup using the application at step S606.

The wireless communication controlling apparatus 130 may receive the multicast packet comprising the legacy AP information from the user terminal 140 at step S610.

The wireless communication controlling apparatus 130 may receive the legacy AP information in connection with the user terminal 140 based on the AP mode if not selecting the wireless Internet setup using the application at step S608. The wireless communication controlling apparatus 130 may perform step S608 again when not receiving the legacy AP information at step S612.

The wireless communication controlling apparatus 130 may determine whether to access the legacy AP 110 based on the STA mode through step S610 or step S612 at step S614. The wireless communication controlling apparatus 130 may perform step S602 again when failing to access the legacy AP 110, restart the IoT device system and support the IoT service when access to the legacy AP 110 has succeeded at step S616.

FIG. 6 describes that steps S602 to S616 are sequentially executed, but the disclosure is not limited thereto. In other words, the steps in FIG. 6 could be changed to executed, or one or more of the steps could be executed in parallel. Therefore, the steps in FIG. 6 are not limited to execute in order of time series.

Figure 7:
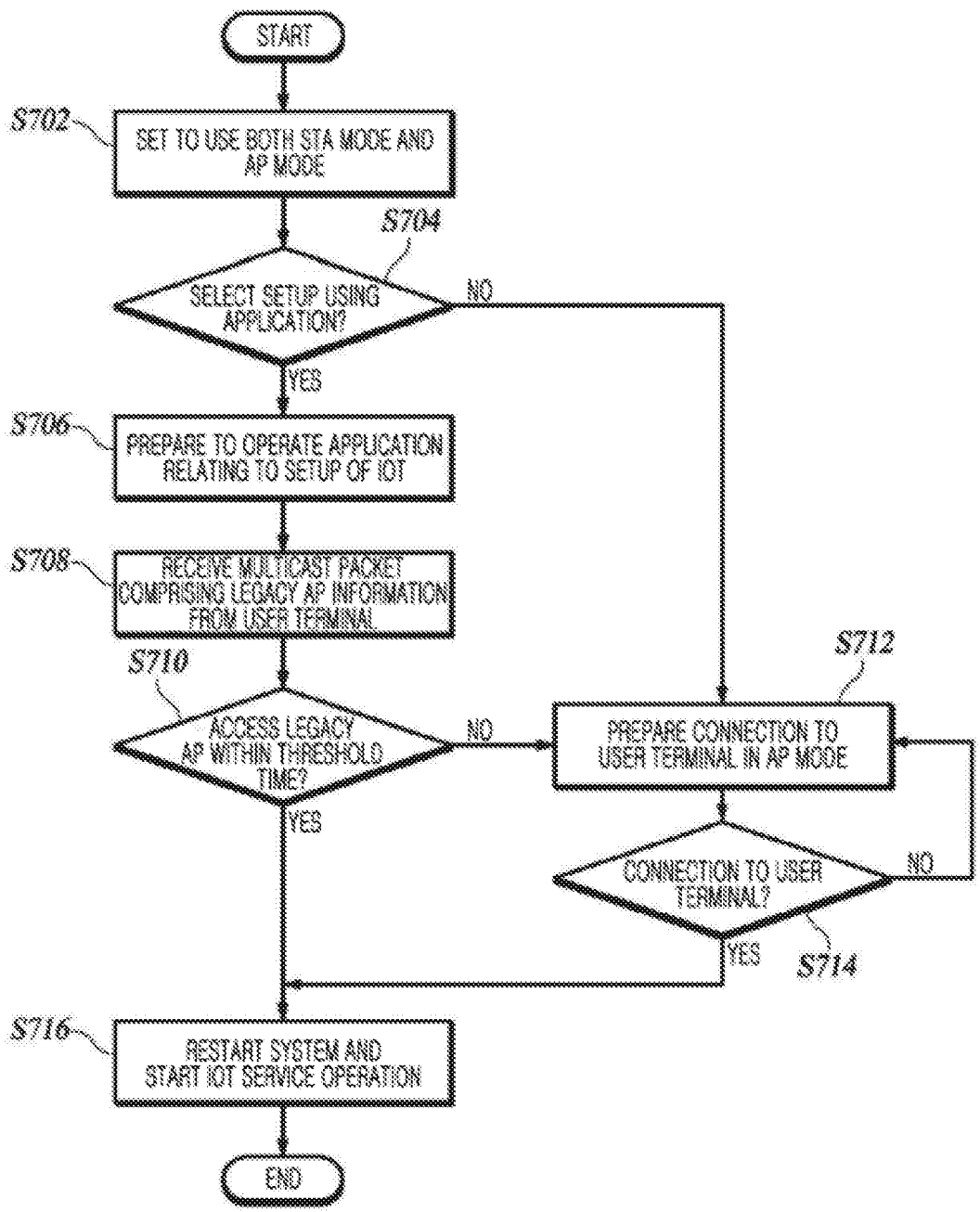
FIG. 7 is a flowchart to explain a method for supporting the setup of wireless Internet of the IoT device when a wireless communication controlling apparatus fails to access legacy AP within a threshold time.

FIG. 7 is a flowchart to explain a method for supporting the setup of wireless Internet of the IoT device when a wireless communication controlling apparatus fails to access legacy AP within a threshold time.

Referring to FIG. 7, steps S702 to S708 are the same as steps S602 to S606, and S610 of FIG. 6. Therefore, the additional description will be omitted.

The wireless communication controlling apparatus 130 may determine whether the legacy AP 110 has been accessed based on the received multicast packet within a threshold time at step S710. The wireless communication controlling apparatus 130 may determine whether the multicast packet is received.

The wireless communication controlling apparatus 130 may prepare connection to the user terminal 140 in the AP mode when failing to access the legacy AP 110 within a threshold time at step S712. The wireless communication controlling apparatus 130 may attempt connection to the user terminal 140 at step S714, and the wireless communication controlling apparatus 130 may perform step S716 when connecting to the user terminal 140, and perform step S712 when not connecting to the user terminal 140.

The wireless communication controlling apparatus 130 may access the legacy AP 110 within a threshold time at step S710, or restart the wireless communication controlling apparatus 130 system when connected to the user terminal 140 at step S714 to support the IoT service at step S716.

FIG. 7 describes that steps S702 to S716 are sequentially executed, but the disclosure is not limited thereto. In other words, the steps in FIG. 7 could be changed to executed, or one or more of the steps could be executed in parallel. Therefore, the steps in FIG. 7 are not limited to execute in order of time series.

Figure 8:
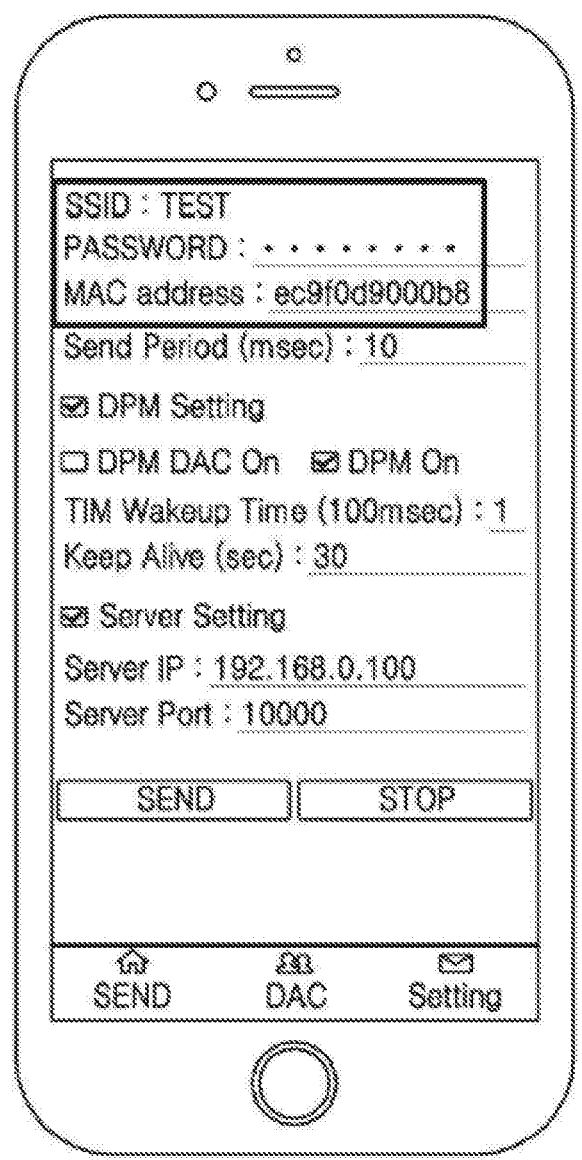
FIG. 8 is a schematic view illustrating a setup control application executed screen in a user terminal.

FIG. 8 is a schematic view illustrating a setup control application executed screen in a user terminal.

Referring to FIG. 8, the user terminal 140 may execute a setup control application. The user terminal 140 may be connected to the legacy AP 110 based on the wireless communication. The user terminal 140 may receive the legacy AP information, i.e. the service set identifier (SSID) and the password of the legacy AP 110 according to the user's operation or command.

The user terminal 140 may transmit the legacy AP information to the wireless communication controlling apparatus 130 through application interlocking. The wireless communication controlling apparatus 130 may set a Promiscuous Mode and receive the multicast packet based the Promiscuous Mode. The Promiscuous Mode may be a mode that receives and reads all types of data packets on the network.

Although exemplary embodiments have been shown and described, it will be appreciated by those skilled in the art that changes may be made to these exemplary embodiments without departing from the principles and spirit of the present disclosure. Accordingly, the exemplary embodiments are intended to explain, not to limit, the present disclosure, and the scope of the present disclosure is not construed as being limited to the described exemplary embodiments. The scope of the protection of the present disclosure should be construed by the claims and as comprising all equivalents within scope of that.

What is claimed is:

1. A wireless communication controlling apparatus comprising a memory and a processor, wherein a wireless communication controlling program containing computerized instructions is stored in the memory and configured to be executed by the processor to:

operate an application;

receive a multicast packet from a user terminal based on the application;

support wireless communication in a concurrent mode for receiving the multicast packet;

determine whether the multicast packet is received from the user terminal based on the application within a predetermined threshold period of time;

collect legacy access point (AP) information in the multicast packet when receiving the multicast packet from the user terminal and collect the legacy AP information directly from the user terminal when not receiving the multicast packet from the user terminal;

attempt to access a legacy AP using the collected legacy AP information from the received multicast packet based on the concurrent mode;

determine whether the legacy AP is accessed within the predetermined threshold period of time; and collect the legacy AP information from the user terminal according to a result of the determining that the legacy AP is not access within the predetermined threshold period of time.

2. The apparatus as claimed in claim 1, wherein the computerized instructions is configured to be executed by the processor to: transmit an access success message to the user terminal based on a determination that the legacy AP is accessed, and collect the legacy AP information from the user terminal based on a determination that the legacy AP is not accessed.

3. The apparatus as claimed in claim 1, wherein the computerized instructions is configured to be executed by the processor to: receive the multicast packet again when failing to access the legacy AP.

4. The apparatus as claimed in claim 1, wherein the legacy AP information includes a Service Set IDentifier (SSID), and a password of the legacy AP included in a multicast address of Mac Header.

5. The apparatus as claimed in claim 2, wherein the concurrent mode includes an STA mode which supports an Internet of Things service by accessing the legacy AP, and an AP mode which supports to collect the legacy AP information from the user terminal based on the legacy AP not being accessed.

6. The apparatus as claimed in claim 1, wherein the supporting wireless communication comprising: supporting to receive the legacy AP information from a provisioning AP using an AP mode of the concurrent mode, and supporting to attempt to access the legacy AP using an STA mode of the concurrent mode.

7. The apparatus as claimed in claim 6, the computerized instructions is configured to be executed by the processor to operate with the provisioning AP based on the concurrent mode.

* * * * *